No. 657,201. Patented Sept. 4, 1900.
C. H. MELVIN.
DISK BEARING.
(Application filed June 12, 1900.)
(No Model.)
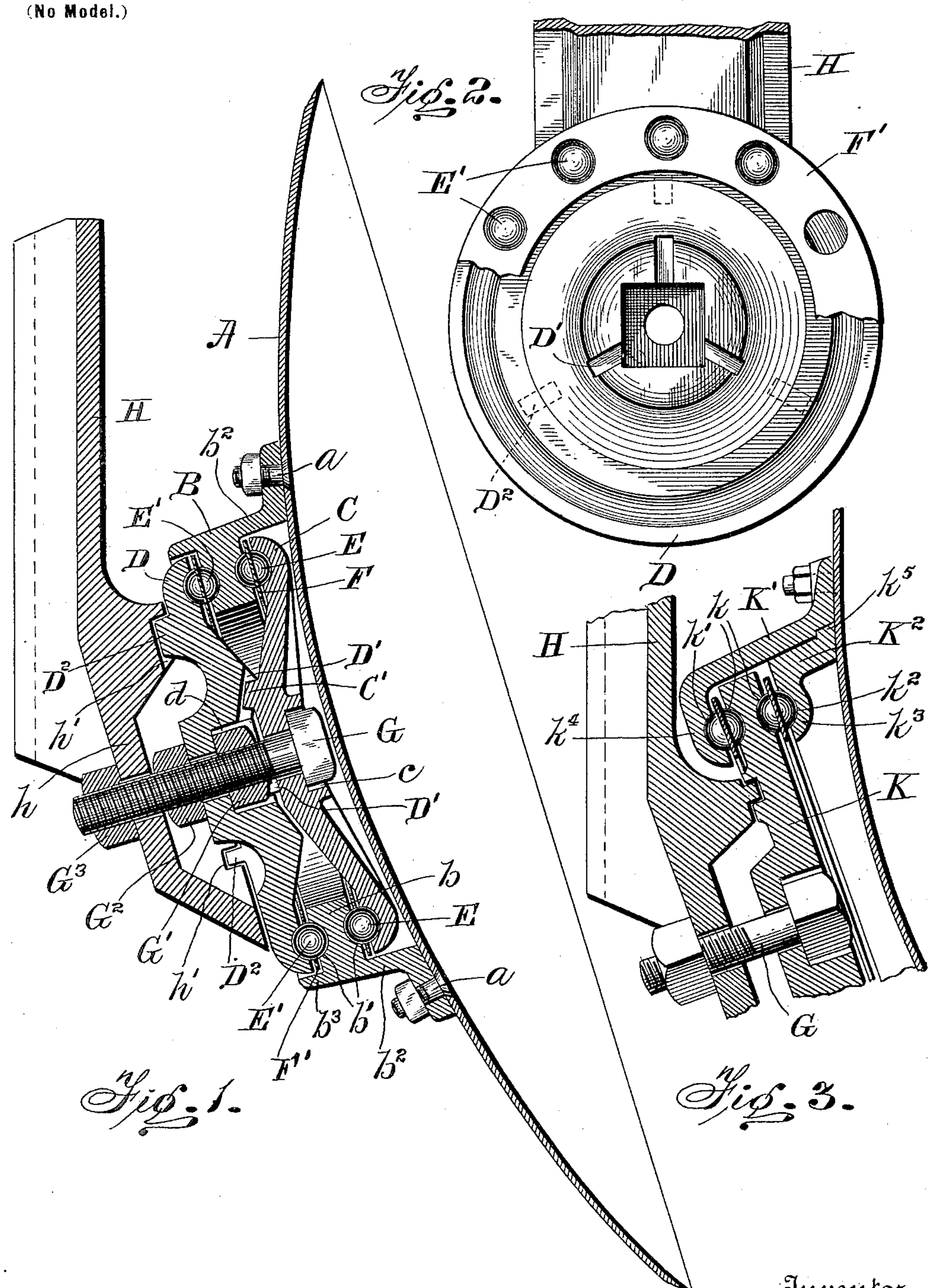
Witnesses
Marcus L. Byng.
Osgood H. Dowell
Inventor
Charles H. Melvin
By Julian C. Dowell
His Attorney
THE NORRIS PETERS CO., PHOTO-LITHO., WASHINGTON, D. C.

UNITED STATES PATENT OFFICE.

CHARLES H. MELVIN, OF MOLINE, ILLINOIS, ASSIGNOR TO THE DEERE & COMPANY, OF SAME PLACE.

DISK-BEARING.

SPECIFICATION forming part of Letters Patent No. 657,201, dated September 4, 1900.

Application filed June 12, 1900. Serial No. 20,048. (No model.)

*To all whom it may concern:*

Be it known that I, CHARLES H. MELVIN, a citizen of the United States, residing at Moline, in the county of Rock Island and State of Illinois, have invented certain new and useful Improvements in Disk-Bearings; and I do hereby declare the following to be a full, clear, and exact description of the invention, such as will enable others skilled in the art to which it appertains to make and use the same.

This invention relates to bearings for rotary disks, and more particularly to bearings for the cutting-disks of plows and other agricultural implements.

The primary objects of the invention are to produce an improved antifriction-bearing for disk plows and the like adapted to reduce friction and having the bearing-surfaces so arranged that all strain in any direction is sustained by balls or other suitable antifriction devices located in suitable races; to provide means for journaling and securing the disk to its support without any projections on its front or working face, so as to secure a perfectly-smooth and unobstructed working face; to provide means for changing the positions of the balls or antifriction devices and contacting wearing-surfaces in such manner that excessively-worn parts may be shifted into positions in which they are less liable to wear, while new or less-worn parts are brought into position where the wear is excessive, thus causing the bearing-surfaces to wear evenly, reducing the friction and increasing the durability of the device, and to provide simple and efficient means for separating the balls or antifriction devices in their races, so as to reduce friction by preventing frictional contact of the balls with each other and also to reduce the number of balls used.

The invention will be first hereinafter more particularly described with reference to the accompanying drawings, which form a part of this specification, and then pointed out in the claims at the end of the description.

In the drawings, in which similar letters of reference are used to denote corresponding parts in the different views, Figure 1 is a vertical sectional elevation of a ball-bearing for disk plows embodying my invention. Fig. 2 is a detail side elevation of a portion of the plow-standard having the inner ball-bearing plates resting thereon and a broken-away portion of the inner ball-spacing ring resting on said plate, and Fig. 3 is a detail sectional view illustrating a modification of the bearing.

Referring to the drawings by letters of reference, the letter A may denote an ordinary concavo-convex cutting-disk of a disk plow or other agricultural implement having an annular plate or casting B secured to the back or convex side thereof by any suitable means, as the bolts and nuts *a a'*, the said plate or casting B being formed or provided with an interior ring-flange *b*, having an annular depression *b'* in each side thereof confronting corresponding annular depressions in the ball-bearing plates or disks C D, so as to provide ball-races on opposite sides of said ring-flange, in which may be seated the annular series of balls E and E'. These balls are preferably confined within the ball-races at prescribed distances apart by means of spacing-rings F F', having apertures therein to receive and hold the balls, thus reducing the number of balls used, and at the same time preventing frictional contact thereof with each other, so as to avoid the friction incident to such contact. Said spacing-rings also serve to clean the balls as they rotate around their respective races. The spacing-ring F' preferably contains a greater number of apertures than the spacing-ring F in order to provide a greater number of balls for the race in which said spacing-ring is fitted, for the reason that the rear balls and the wearing-surfaces of the ball-race in which they run are subjected to greater friction and labor than the balls in the front or outer ball-race.

The ball-bearing plate or disk D has in its front face a central, preferably polygonal, depression or recess *d* to receive the adjusting lock-nut G', which is screwed upon the fastening-bolt G, said adjusting-nut being confined in said recess, so as to clamp the bearing-plate between the same and a lock-nut $G^2$, screwed upon the same bolt between the bearing-plate and the foot or shank of the hanger or standard H. The said fastening-bolt has its head seated in a recess $c$ (preferably polygonal) in the plate C, through which it passes, and extends through an aperture in the shank or foot of the hanger and has a lock-nut $G^3$ screwed thereon, whereby the two bearing plates or disks on which the cutting-disk is rotatively journaled and the shank or plow standard are secured together and held in a fixed position relatively to the rotating disk, but in such manner that the entire combination of bearing-plates, balls, and ball-races, with the retainers or spacing-rings confined in said races and the disk supported thereon, may be detached from the standard or other support by removing the single nut $G^3$ and without disturbing the adjustment or relative arrangement of the detached parts. In order that the wearing-surfaces of the ball-races may be changed to compensate for the difference in wear upon those parts of the races which are subject to wear more rapidly than other parts, the bearing plates or disks C and D and the shank or foot $h$ of the hanger or support H may be provided with interlocking projections or lugs and recesses so arranged that when a certain part becomes worn to a sufficient extent the parts may be adjusted and secured in position to bring a new or less-worn part into proper relation to receive the wear, thereby causing the wearing-surfaces of the ball-races and the balls to wear more evenly and increasing the efficiency and durability of the device. To this end the foot or shank of the disk hanger or support H may be constructed with three (more or less) recesses $h'$ to receive corresponding lugs or projections $D^2$ on the back of the bearing-plate D, or vice versa, while said bearing-plate is provided in its front face with a corresponding series or number of recesses $D'$ $D'$ to receive interlocking lugs or projections $C'$ on the front face of the bearing-plate C, or vice versa.

In operation the bottom or upward and side thrust of the disk is usually borne by about one-third of the balls in the lower portions of the ball-races, while the "pull-off" or discharge thrust is borne by about the same number of balls in the upper portions of the races, and by the described construction when one-third of the balls or races are worn to excess the bearing plates or disks C D may be turned one-third around (or to a greater or less extent, according to the number of interlocking lugs and recesses used) and again locked in the desired position and held by the lock-nuts $G'$, $G^2$, and $G^3$, as may be desired, thereby obtaining a new wearing surface or surfaces after such adjustment, and so on a second or any greater number of times until the whole of such surfaces are worn and unfit for further use, and, as will be seen, the positions of the plates C and D, both as to change of wearing position and their relation to the wearing-ring B and the balls E, contained in the ball-races, may be adjusted and regulated according to requirements in practical use, so as to insure an easy-running movement of the disk and even wearing of the balls and their races. It will also be observed that with the described construction all strain in any direction is carried on the several balls located in the two ball-races at the front and rear of the wearing-ring B, which rotates with the cutting-disk, while the bearing-plates C and D remain stationary or in a relatively-fixed position with reference to the rotary disk. The wearing positions of either or both of said plates may be changed independently of either by merely loosening the lock-nuts on the fastening-bolt and giving said plates a partial rotation in the same direction or in opposite directions, as may be required, and then securing the same in the desired position by readjusting and securing the nuts on the fastening-bolt. The spacing-ring $F'$ serves the double function of separating and cleaning the balls and also, by reason of its location with respect to the only opening for the admission of dust or dirt to the ball-races, serves as a shield or guard to exclude dust and dirt from said races, while the overhanging portion $b^8$ of the annular plate or casting B, surrounding the disk D, serves as a shield or dust-protector for the race formed by the confronting annular depressions in said plate and the ring-flange $b$, and the inner portion $b^2$ of said plate or casting B effectually guards and shields the inner ball-race against the admission of dust and dirt.

I thus provide a very efficient and durable ball-bearing for a rotary-disk plow or similar agricultural implement, which in practical use may be easily adjusted for the purpose of shifting the bearing-surfaces or for the purpose of substituting a new part for any part thereof that may become worn or broken.

It may be practicable in some cases to use other forms of antifriction devices than balls by fitting them in suitable annular depressions or races formed in the confronting faces of the bearing-disks and ring-flange to which the cutting-disk is secured; but I preferably employ balls working in concave recesses, as shown. While I preferably employ flat steel spacing-rings for separating the balls and retaining them at suitable distances apart within the ball-races, it may be desirable in some cases to dispense with such spacing-rings or to use other suitable devices for spacing the balls. It is also obvious that the positions of the interlocking lugs or projections for shifting the wearing-surfaces of the balls and their races may be reversed, so that either ball-bearing disk or plate may be recessed and the other provided with a lug or lugs engaging said recess or recesses, (the number of which will depend upon circumstances or the desire of the manufacturer,) while the inner plate may be recessed for engaging with a lug on the standard or hanger, and instead of the specific means shown for securing the ball-bearing plates or disks to the hanger other means may be employed, and various other changes may be made in the details without departing from the spirit of the invention.

In disk plows as heretofore constructed it has been the common practice to secure the disk to a centrally-disposed hub or journal-bearing by means of a fastening bolt or bolts passing through the disk at or about its center, thus forming an obstruction or obstructions on the front or working face of the disk, which, by collecting grass and dirt tend not only to increase the draft, but to decrease the efficiency of the device. Moreover, the wearing-surfaces of the disk-bearing being located centrally of the disk are subjected to great strain, which increases the friction and causes the wearing-surfaces of the bearing to rapidly wear away. It will be observed that by the described construction I overcome the first-mentioned objection by journaling and securing the disk to its support without any projections on its front or working face, and thereby secure a perfectly-smooth and unobstructed working surface, while the wearing-surfaces of the disk-bearing are located outside of the center or between the circumferential portion of the disk and its center at a point where the leverage is greatly reduced by reason of the distance of such bearing-points from the center, thus relieving the central portion from great strain and distributing the strain and wear on the bearing-surfaces in such manner as to reduce the friction to a minimum and thus prolong the life of the bearing.

While the larger number of balls are placed in the race farthest removed from the disk, in the present instance, as stated, it may be desirable to place a less number of balls in said race and a greater number in the other race in order that the race having the greatest strain may have the larger number of balls, which might be either race under different conditions.

It is obvious that the described arrangement might be reversed and still be within the spirit and scope of my invention—that is to say, a single bearing disk or plate K, Fig. 3, having annular bearing-surfaces $k$ $k$ on opposite sides thereof, might be substituted for the disks or plates C D, which in the preferred arrangement (shown in Fig. 1) constitute the relatively-fixed part or support for the disk, said single disk or plate K being straddled or embraced by a rotary element K′ K² as a substitute for the rotary element B in Fig. 1, said element K′ K², having a U-shaped form in cross-section, being composed of separate parts, with annular bearing-surfaces $k'$ $k^2$ in the confronting faces of the annuli or ring-flanges $k^3$ $k^4$ thereon, thus confining the single relatively-fixed bearing-disk in substantially the same manner that the ring-flange $b$ of the element B is confined between the confronting bearing-surfaces of the plates or disks C and D in Fig. 1. In this construction the plate K remains stationary, while the plates or annuli K′ K² revolve in contact with the double series of balls or antifriction devices confined in the ball-races between said plates. To provide for the shifting of the annulus K², when it is desirable to change its position on account of the wear, it may be provided with a series of lugs $k^5$, adapted to fit corresponding recesses on the inner side of the annulus K′, said lugs and recesses performing the same functions as the lugs and recesses C′ and D′ on the plates C and D in Fig. 1. The modified form of disk-bearing hereinbefore described and illustrated in Fig. 3 will form the subject of a divisional application. It will be observed that the fastening-bolt G in the construction shown in Fig. 1, in addition to its function of fixing the adjustment of the plates C and D with reference to the plate B, so as to bring said parts nearer together or farther apart, as the wear of the ball-races may require, also holds them in position with reference to each other—that is, when the plates are set so that the lugs on one fit into certain recesses of the other.

Having thus fully described my invention, what I claim as new, and desire to secure by Letters Patent of the United States, is—

1. A composite antifriction-bearing for disk plows and the like, comprising a plurality of relatively-fixed parts or supports, each having an annular depression in one face or side thereof, a bearing-ring carried by or revolving with the disk rotatively arranged between said fixed parts and having in each side thereof an annular depression confronting a corresponding depression in the adjacent fixed part, a series of balls located in each of the races formed by the confronting depressions in said bearing-ring and supports, and means for securing said supports and the bearing-ring rotatively mounted thereon to a standard or other suitable support, whereby the strain in every direction is sustained by the double series of balls, substantially as described.

2. In a rotary-disk plow, the combination with the standard or hanger, of a pair of circular bearing-plates secured thereto, and means for rotatively shifting the positions of said plates independently of each other, a rotary disk carrying a bearing-ring rotatively arranged between said bearing-plates and having on each side thereof an annular depression confronting a corresponding depression in the adjacent bearing-plate, and a series of balls confined in the races formed by said confronting depressions, substantially as described.

3. In a disk plow, a composite antifriction-bearing for the rotary disk, comprising a pair of relatively-fixed parts or supports about which the disk may rotate, a rotary element carried by or revolving with the disk rotatively arranged between said relatively-fixed parts or supports, an annular series of antifriction devices interposed between confronting bearing-surfaces on said rotary element and the adjacent fixed part or support, and means for securing said fixed parts and rotary element together and to a plow-standard or other suitable support therefor, substantially as described.

4. In a disk plow, a composite antifriction-bearing for the rotary disk, comprising a pair of relatively-fixed parts or supports about which the disk may rotate, a rotary element carried by or revolving with the disk rotatively arranged between said fixed parts, and a series of balls interposed between an annular bearing-surface at each side of said rotary element and a corresponding bearing-surface on the confronting face of one of said fixed parts, substantially as described.

5. In a disk plow, a composite antifriction-bearing for the rotary disk, comprising a pair of relatively-fixed parts or supports about which the disk may rotate, a rotary element carried by or revolving with the disk rotatively arranged between said fixed parts and a series of balls interposed between an annular bearing-surface at each side of said rotary element and a corresponding bearing-surface on the confronting face of one of said fixed parts, together with means for adjusting and securing said fixed parts to a plow standard or hanger, so as to shift the positions of the bearing-surfaces thereon and of the balls in their respective races in such manner as to cause those parts that are least exposed to wear to take the position of excessively-worn portions, substantially as described.

6. In combination with the rotary disk having the annular bearing plate or ring thereon, two circular bearing plates or disks, between which said bearing plate or ring is rotatively arranged, each having an annular depression therein confronting a corresponding depression in said bearing-plate, and balls working in the races formed by the confronting depressions, together with means for securing said circular plates to a standard or support in different positions, so as to change the positions of excessively-worn bearing-surfaces of the balls and their races, substantially as described.

7. In combination with the rotary disk, the circular ball-bearing plates having annular depressions or recesses in their confronting faces and an interposed bearing ring or annulus having corresponding depressions in opposite sides thereof confronting the depressions in said plates, a series of balls seated in the races formed by said depressions, interlocking lugs and recesses for holding said circular plates in different positions, and means for securing said plates together and holding them in fixed positions relatively to the cutting-disk rotatively mounted thereon, substantially as described.

8. In a disk plow, the combination with a pair of relatively-fixed parts or supports and a rotary element confined between said parts and carried by or secured to the disk, a series of balls interposed between confronting faces of said relatively-fixed parts and opposite sides of the interposed rotary element, substantially as described.

9. In a disk plow, the combination with a pair of relatively-fixed parts or supports and a rotary element confined between said parts and carried by or secured to the disk, a series of balls interposed between confronting faces of said relatively-fixed parts and opposite sides of the interposed rotary element, together with means for holding said balls at suitable distances apart in their respective courses or races, substantially as described.

10. In a disk plow, a composite antifriction-bearing for the disk, comprising a pair of relatively-fixed parts or supports about which the disk may rotate, a ball-bearing element arranged to rotate between said relatively-fixed parts and secured to or arranged to rotate with the disk, and an annular series of balls interposed between bearing-surfaces on said relatively-fixed parts confronting corresponding surfaces on opposite sides of said rotary element, whereby the latter is confined between said relatively-fixed parts in rotative engagement with a double series of balls adapted to sustain the strain in all directions, substantially as described.

11. In a disk plow, a composite antifriction-bearing comprising a pair of relatively-fixed parts or supports about which the disk may rotate, a rotary element arranged between said relatively-fixed parts and having on opposite sides thereof annular bearing-surfaces each confronting a corresponding annular bearing-surface on one of said relatively-fixed parts, thus forming a ball-race at each side of said rotary element, together with a series of balls in each of said races, and spacing-rings apertured at intervals to receive and hold said balls at prescribed distances apart in their respective races, substantially as described.

12. In a disk plow, the combination with the plow standard or support, and a pair of circular disks or bearing-plates secured thereto, means whereby either of said disks may be rotated and secured in a fixed position upon the standard independently of the other, a rotary element carried by or revolving with the rotary cutting-disk, arranged between said bearing-plates, and having a bearing-surface at each side thereof confronting a similar bearing-surface in the face of the adjoining bearing-plate, and a series of balls fitted in the races formed between said rotary element and the confronting faces of said bearing-plates, substantially as described.

13. In a disk plow, the combination with the plow standard or support, and a pair of circular disks or bearing-plates secured thereto, means whereby either of said disks may be rotated and secured in a fixed position upon the standard independently of the other, a rotary element carried by or revolving with the rotary cutting-disk, arranged between said bearing-plates, and having a bearing-surface at each side thereof confronting a similar bearing-surface in the face of the adjoining bearing-plate, and a series of balls fitted in the races formed between said rotary element and the confronting faces of said bearing-plates, together with means for holding said balls at prescribed distances apart in their respective races, substantially as described.

14. In a disk plow, the plow standard or hanger, the ball-bearing plates or disks adjustably secured thereto by a suitable fastening-bolt, and having recesses on one of said parts to receive an interlocking lug or lugs on the adjacent part, whereby the bearing-plates may be rotated about the fastening-bolt and secured in different positions, in combination with a rotary element carried by or revolving with the cutting-disk and a double series of balls on which said rotary element has its bearings, each series of balls being confined between confronting bearing-surfaces of said rotary element and one of said bearing-plates, substantially as described.

15. In a disk plow, the plow standard or hanger, and a pair of bearing-plates adjustably secured thereto by a suitable fastening-bolt and recesses on one of said parts to receive an interlocking lug or lugs on an adjacent part, whereby the bearing-plates may be rotated about the fastening-bolt and secured in different positions, in combination with an annulus or bearing-ring carried by or revolving with the cutting-disk and arranged between said bearing-plates, the latter having an annular bearing-surface on each confronting a similar bearing-surface on said bearing-plate, and a series of balls confined at intervals in the races formed between said bearing-surfaces, substantially as described.

16. In combination with the rotary cutting-disk, and a relatively-fixed part or support therefor, a rotary element carried by and adapted to revolve with the disk, and a series of antifriction devices interposed between said rotary element and said support, in rolling contact therewith at a point intermediate the center and circumference of the disk, whereby the disk is supported and has its bearings on said antifriction devices some distance from its center.

17. In combination with the rotary cutting-disk, and a relatively-fixed part or support therefor, a rotary element carried by and adapted to revolve with the disk, and a duplex series of antifriction devices interposed between said rotary element and said support, in rolling contact therewith, whereby the disk is supported and has its bearings on said antifriction devices between the circumferential portion of the disk and its center.

18. In combination with the rotary cutting-disk, and a relatively-fixed part or support therefor, a rotary element carried by and adapted to revolve with the disk, a series of antifriction devices interposed between said rotary element and said support in rolling contact therewith, and means for rotatively adjusting said support so as to change the position of the bearing-surfaces, substantially as described.

19. In combination with the cutting-disk, a pair of relatively-fixed parts or supports, an annulus carried by or secured to the disk rotatively fitted and confined between said parts and a series of antifriction devices interposed between confronting bearing-surfaces on said relatively-fixed parts and the opposite sides of said annulus, substantially as described.

20. A rotary cutting-disk having a smooth and unobstructed front or working face, in combination with a relatively-fixed part or support on which the disk has its bearings, and means for securing said parts to a standard or hanger without any bolt or projection penetrating the center of the disk.

21. A rotary cutting-disk having a smooth and unobstructed front or working face with a non-perforated central portion, and rotatably mounted on a suitable bearing therefor, at the back of the disk, without any bolt or projection penetrating the central portion of the disk, substantially as described.

22. In combination with the rotary disk, and an annular series of antifriction devices, such as balls or rollers, a flat spacing-ring having a series of apertures therein to receive and hold said antifriction devices apart in rotary contact with opposing bearing-surfaces between which the antifriction devices are confined, substantially as described.

23. In combination with the rotary cutting-disk, a composite antifriction-bearing therefor comprising a relatively-fixed part or support about which the disk may rotate and on which the disk has its bearings at a point between its circumferential portion and its center, a rotary element carried by or revolving with the disk, and a double annular series of antifriction devices in rolling contact with confronting bearing-surfaces between said rotary element and the circumferential portion of said fixed part or support.

24. In combination with the rotary cutting-disk, a composite antifriction-bearing therefor comprising a relatively-fixed part or support about which the disk may rotate, a rotary element carried by or revolving with the disk, and a double annular series of antifriction devices in rolling contact with confronting bearing-surfaces between said rotary element and said fixed part or support, together with means for adjusting said fixed part or support so as to change the positions of the bearing-surfaces thereof and of the antifriction devices in such manner as to cause those parts that are least exposed to wear to take the position of excessively-worn portions, substantially as described.

25. A disk-bearing comprising a suitable support, means for securing the disk in rotative engagement with said support, and antifriction devices arranged in annular series between confronting bearing-surfaces on said support and disk outside of the central portion of the latter, whereby the disk has its bearings on said annular series of antifriction devices located between its center and circumference, substantially as described.

26. A disk-bearing comprising a suitable support and means for securing the disk in rotative engagement therewith, together with antifriction devices on which the disk has its bearings at a point between its center and circumference; said antifriction devices being arranged between confronting bearing-surfaces on said support and disk, at the back of the latter, substantially as described.

In testimony whereof I affix my signature in presence of two witnesses.

CHARLES H. MELVIN.

Witnesses:

A. M. DAHL,
WM. BUTTERWORTH.